United States Patent Office 3,055,885
Patented Sept. 25, 1962

3,055,885
NOVEL AMINO ESTRATETRAENES, INTERMEDIATES, AND PROCESS
Gérard Nominé, Noisy-le-Sec, Daniel Bertin, Montrouge, Robert Bucourt, Villiers-le-Bel, and André Pierdet, Noisy-le-Sec, France, assignors, by mesne assignments, to Roussel-UCLAF, S.A., Paris, France, a corporation of France
No Drawing. Filed Oct. 18, 1961, Ser. No. 146,005
Claims priority, application France Oct. 13, 1959
23 Claims. (Cl. 260—239.5)

The invention relates to novel 3-amino-17β-acyloxy-$\Delta^{1,3,5(10),9(11)}$-estratetraenes having the formula:

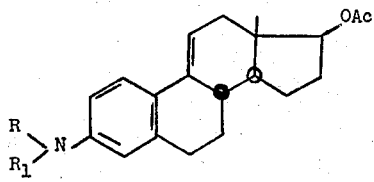

wherein Ac is an acyl radical of an organic carboxylic acid having 1 to 18 carbon atoms and R and $R_1$ are selected from the group consisting of hydrogen, lower alkyl and lower hydroxy alkyl and when taken together form a heterocyclic ring selected from the group consisting of pyrrolidyl, piperidyl and morpholino. The invention further relates to novel processes for producing said amino estratetraenes and intermediates thereof.

This application is a continuation-in-part of Serial No. 59,166, filed September 29, 1960, and Serial No. 110,329, filed May 16, 1961, both abandoned.

As intermediates, more particularly, it relates to novel 8α,9α - epoxy - 3β - methyl - 7 - oxo - 8β - (3' - oxobutyl) - 3,4 - [3'β - acyloxy - cylopentano - (2',1')] - decahydronaphthalene compounds of the formula:

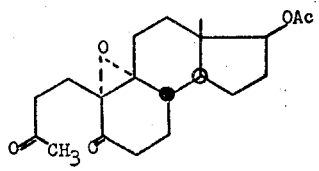

wherein Ac has the above meaning.

The 3-amino-estratetraenes of Formula I and the cyclopentano-decahydronaphthalenes of Formula II have the characteristic stereospecific configuration of natural products. The compounds of Formula I possess anabolic activity without estrogenic or androgenic activity. They also exercise a retarding action on hypophysis.

It is an object of the invention to provide novel 3-amino-17β-acyloxy-$\Delta^{1,3,5(10),9(11)}$-estratetraenes of Formula I.

It is another object of the invention to provide novel processes for the preparation of compounds of Formula I.

It is a further object of the invention to provide novel intermediates for the preparation of compounds of Formula I.

Another object of this invention is the production of 8α,9α - epoxy - 3β - methyl - 7 - oxo - 8β - (3' - oxobutyl)- 3,4-[3'β-acyloxy-cyclopentano-(2',1')] - decahydronaphthalene compounds of the structural formula:

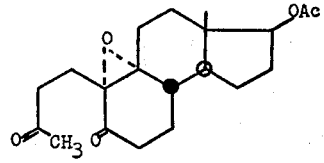

wherein Ac represents the acyl radical of an organic carboxylic acid having from 1 to 18 carbon atoms, and especially 8α,9α-epoxy-3β-methyl-7-oxo-8β-(3'-oxobutyl)-3,4-[3'β-benzoyloxy - cyclopentano-(2',1')] - decahydronaphthalene.

These and other objects and advantages of the invention will become obvious from the following detailed description.

The 3-amino-estratetraenes of the invention have the formula:

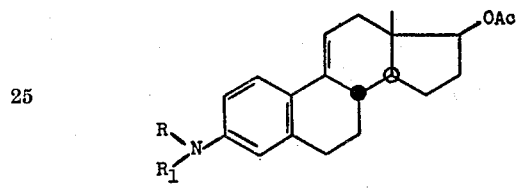

wherein Ac is the acyl radical of an organic carboxylic acid having 1 to 18 carbon atoms and R and $R_1$ are selected from the group consisting of hydrogen, lower alkyl and lower hydroxy alkyl and when taken together form a heterocyclic ring selected from the group consisting of pyrrolidyl, piperidyl and morpholino.

The organic carboxylic acid having 1 to 18 carbon atoms may be aliphatic, cycloalkyl or aromatic. Suitable organic carboxylic acids are alkanoic and alkenoic such as acetic acid, trimethylacetic acid, propionic acid, butyric acid, 4,4-dimethylpentanoic acid, 10-undecenoic acid; cycloalkyl alkanoic acids such as β-cyclopentyl propionic acid; arylalkanoic acids such as phenyl propionic acid, phenoxyacetic acid; cycloalkanoic acids such as hexahydrobenzoic acid, hexahydroterephthalic acid; and phenyl carboxylic acids such as benzoic acid and 3,5-dinitrobenzoic acid.

The process for the preparation of the compounds of Formula II consists essentially of subjecting $\Delta^{8(9)}$-3β-methyl-7-oxo-8-(3' - oxobutyl)-3,4-[3'β-acyloxy - cyclopentano-(2',1')]-octahydronaphthalene compounds having the structural formula

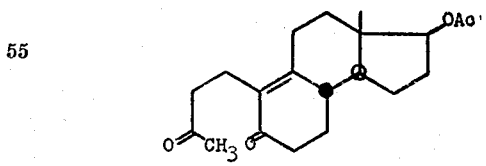

wherein Ac has the meaning indicated above, in an inert organic solvent to a reaction with oxidizing agents capable of replacing the double bond in the 8,9 position by an oxide bridge, such as particularly the organic percarboxylic acids. It is particularly advantageous to use, as the percarboxylic acid, perphthalic acid.

The starting compounds are obtained according to the process described in the copending, commonly-assigned U.S. Patent 3,019,252 by subjecting a Δ⁹⁽¹⁰⁾-3β-methyl-7-oxo-3,4-[3′β-acyloxy - cyclopentano-(2′,1′)]-octahydronaphthalene compound of the formula:

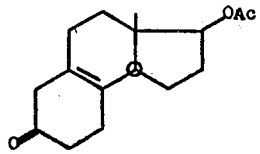

where Ac has the meaning given above, to a condensation reaction with 1,3-dichloro-2-butene in the presence of an alkaline condensation agent and hydrolyzing the resulting Δ⁹⁽¹⁰⁾-3β-methyl-7-oxo-8-(3′-chloro-2′-butenyl)-3,4-[3′β-acyloxy - cyclopentano-(2′,1′)]-octahydronaphthalene compounds of the formula:

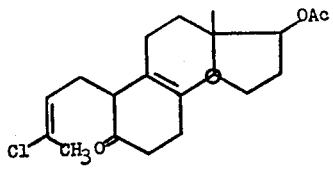

where Ac has the meaning given above with simultaneous isomerization, to obtain the desired starting compounds.

A preferred mode of execution of the process of the invention is to employ the benzoic acid ester.

One process for the preparation of compounds of Formula I comprises reacting a racemate or optically active compound of the formula:

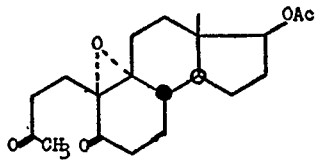

II wherein Ac has the above definition with an acid salt of a primary or secondary amine to form the 3-amino-17β-acyloxy-Δ¹,³,⁵⁽¹⁰⁾,⁹⁽¹¹⁾-estratetraene of Formula I and recovering said estratetraene.

The amine reactant has the formula:

$$\begin{array}{c}R\\ \diagdown\\ N-H\\ \diagup\\ R_1\end{array}$$

wherein R and R₁ have the above definition. Examples of suitable amines for the action are ammonia, methylamine, ethylamine, monoethanol amine, dimethyl amine, diethylamine, pyrrolidine, piperidine, morpholine, etc. The acid salt is preferably the acetate salt.

The reaction is preferably effected by mixing the reactants in a non-polar organic solvent such as benzene or toluene and heating the solution to the reflux temperature of the solvent until the reaction is complete, usually one-half hour to one hour. After washing the reaction mixture with water and evaporating off the solvent, a residue is obtained and may be purified by crystallization from organic solvents such as methanol, ether, etc.

The second process for the preparation of the compounds of Formula I comprises cyclizing a 8α,9α-epoxy-3β-methyl-7-oxo-8β-(3′-oxobutyl)-3,4-[3′β-acyloxy - cyclopentano-(2′,1′)]-decahydronaphthalene of Formula II under alkaline conditions to form the corresponding ester of 9α,10α-epoxy-19-nor-testosterone, reacting the latter with a primary or secondary amine having the formula:

$$\begin{array}{c}R\\ \diagdown\\ N-H\\ \diagup\\ R_1\end{array}$$

wherein R and R₁ have the above definitions to form a 3-amino-9α-hydroxy-17β-acyloxy-Δ¹,³,⁵⁽¹⁰⁾-estratriene having the formula:

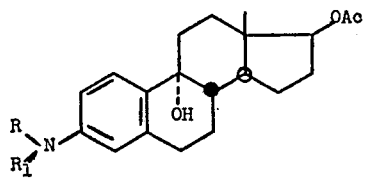

III wherein R, R₁ and Ac have the above definitions, dehydrating the latter to form compounds of Formula I and recovering the product.

A preferred process for the preparation of compounds of Formula I comprises cyclizing the 8α,9α-epoxy-3β-methyl-7-oxo-8β-(3′-oxobutyl)-3,4-[3′β-acyloxy - cyclopentano-(2′,1′)]-decahydronaphthalene with an alkali metal acetate such as sodium acetate or potassium acetate in the presence of a hydroxide of the same metal in a solvent such as dioxane to form the corresponding ester of 9α,10α-epoxy-19-nor-testosterone, reacting the said ester with a primary or secondary amine in a lower alkanol such as methanol in the presence of a mutual solvent such as benzene or toluene to form the corresponding 3-amino-9α-hydroxy-17β-acyloxy-Δ¹,³,⁵⁽¹⁰⁾-estratriene, dehydrating the latter dissolved in an inert solvent such as benzene with acetic acid to form the compound of Formula I and recovering said compound. The reaction scheme is illustrated in Table I.

TABLE I

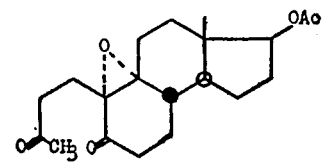

↓

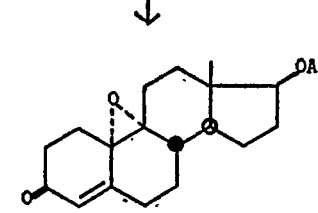

↓

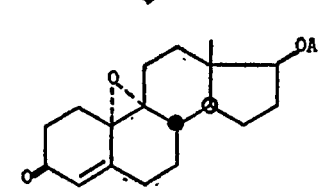

↓

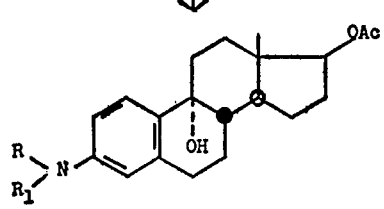

II wherein R, R₁ and Ac have the above definitions.

In the following examples there are described several preferred embodiments to illustrate the invention. However, it should be understood that the invention is not intended to be limited to the specific embodiments.

The melting points are instantaneous melting points determined on a Maquenne block. The temperatures are indicated in degrees centigrade.

Example I

PREPARATION OF $8\alpha,9\alpha$-EPOXY-$3\beta$-METHYL-7-OXO-$8\beta$-(3'-OXOBUTYL)-3,4-[3'$\beta$-BENZOYLOXY-CYCLOPENTANO-(2',1')]-DECAHYDRONAPHTHALENE, II, Ac=C₆H₅CO 0.100 gm. of $\Delta^{8(9)}$-$3\beta$-methyl-7-oxo-8-(3'-oxobutyl)-3,4-[3'$\beta$-benzoyloxy-cyclopentano-(2',1')]-octahydronaphthalene was dissolved in 1 cc. of dry dichloro-ethane, then 0.30 cc. of a 25% ethereal solution of perphthalic acid was added thereto under agitation and in an atmosphere of nitrogen. The reaction mixture was agitated overnight at room temperature, next, the phthalic acid formed was vacuum filtered and the filtrate solution was washed successively with a 1% sodium bisulfate solution, with water, with sodium bicarbonate and again with water. The washed solution was dried over sodium sulfate and evaporated to dryness in vacuo to recover a colorless resin, $8\alpha,9\alpha$-epoxy-$3\beta$-methyl-7-oxo-$8\beta$-(3'-oxo-butyl)-3,4-[3'$\beta$-benzoyloxy-cyclopentano-(2',1')]-decahydronaphthalene, II, Ac=C₆H₅CO, which was purified by dissolving in hot isopropyl ether and crystallizing by icing. The yield was 0.061 gm. (that is, 60% of theory) of the product which was obtained in the form of colorless prismatic crystals having a melting point of 147° C. This product was soluble in most of the customary organic solvents such as ether, acetone, benzene, chloroform, methyl and ethyl alcohol etc., and insoluble in water and dilute aqueous acids or alkalies.

*Analysis:*—C₂₅H₃₀O₅: molecular weight=410.49. Calculated: C, 73.14%; H, 7.37%. Found: C, 72.9%; H, 7.5%.

The infra-red spectrum shows the presence of three bands which are characteristic of the epoxide function at 929 cm.⁻¹, 833 cm.⁻¹ and 810 cm.⁻¹.

This product is not described in the literature.

The starting material is obtained by condensation of $\Delta^{9(10)}$-$3\beta$-methyl-7-oxo-3,4-[3'$\beta$-benzoyloxy-cyclopentano-(2',1')]-octahydronaphthalene with 1,3-dichloro-2-butene in the presence of sodium ter-amylate and hydrolysis of the resulting $\Delta^{9(10)}$-$3\beta$-methyl-7-oxo-8-(3'-chloro-2'-butenyl)-3,4-[3'$\beta$-benzoyloxy-cyclopentano-(2',1')]-octahydronaphthalene, as it has been described in U.S. Patent 3,019,252.

Example II

PREPARATION OF 3-PYRROLIDYL-$17\beta$-BENZOYLOXY-$\Delta^{1,3,5(10),9(11)}$-ESTRATETRAENE 0.040 g. of $8\alpha,9\alpha$-epoxy-$3\beta$-methyl-7-oxo-$8\beta$-(3'-oxobutyl)-3,4-[3'$\beta$-benzoyloxy-cyclopentano-(2',1')]-decahydronaphthalene, melting at 147° C., obtained according to Example I were dissolved under a nitrogen atmosphere in 1.6 cc. of anhydrous benzene. 0.25 cc. of pyrrolidine were added to the solution. The solution was neutralized by 0.25 cc. of acetic acid, agitated and the reaction mixture allowed to stand in an atmosphere of nitrogen for a period of several minutes. A golden yellow color appeared. The reaction mixture was heated to reflux for a period of an hour, then after cooling, washed with water and dried over magnesium sulfate. The benzene solution was distilled to dryness under vacuum and the residue after trituration in isopropyl ether consisted of 0.035 g. of crystals of 3-pyrrolidyl-$17\beta$-benzoyloxy-$\Delta^{1,3,5(10),9(11)}$-estratetraene which was purified by recrystallization in methanol. The yield was 0.030 g. of product melting at 240° C.

Ultra-violet spectrum (in ether after dissolution in methylene chloride):

$\lambda_{max}$. 297 m$\mu$, $E^{1\%}_{1cm}$.=619

Ultra-violet spectrum (in a mixture of ether-ethanol and 10 N hydrochloric acid):

$\lambda_{max}$. 222 and 229 m$\mu$, $E^{1\%}_{1cm}$.=580

$\lambda_{max}$. 262 m$\mu$, $E^{1\%}_{1cm}$.=437

Inflexion 290 m$\mu$, $E^{1\%}_{1cm}$.=128.5

Inflexion 300 m$\mu$, $E^{1\%}_{1cm}$.=99

The product was present in the form of fine pale yellow needles, very soluble in benzene, soluble in chloroform, isopropyl ether, slightly soluble in methanol or ethanol, and insoluble in water and dilute aqueous alkalies.

The product has not been described in the literature.

Example III

PREPARATION OF 3-($\beta$-HYDROXYETHYL)-AMINO-$17\beta$-BENZOYLOXY-$\Delta^{1,3,5(10),9(11)}$-ESTRATETRAENE 30 mg. of $8\alpha,9\alpha$-epoxy-$3\beta$-methyl-7-oxo-$8\beta$-(3'-oxobutyl)3,4-[3'$\beta$-benzoyloxy-cyclopentano-(2',1')]-decahydronaphthalene, melting point 147° C., were introduced into 2 cc. of anhydrous toluene and 0.25 cc. of ethanolamine was added. The reaction mixture was neutralized by 0.25 cc. of acetic acid and heated to reflux under agitation in an atmosphere of nitrogen for a half hour. The reaction mixture was then cooled and the toluene solution washed with water. It was evaporated to dryness under vacuum and a residue was obtained comprising 3-($\beta$-hydroxyethyl)-amino-$17\beta$-benzoyloxy $\Delta^{1,3,5(10),9(11)}$-estratetraene which was crystallized from isopropyl ether and recrystallized in methanol. The product was present in the form of brilliant needles melting at 182–183° C.

Ultra-violet spectrum (ethanol):

$\lambda_{max}$. 228 m$\mu$, $E^{1\%}_{1cm}$. 590

$\lambda_{max}$. 284 m$\mu$, $E^{1\%}_{1cm}$. 550

(Ethanol N/100 hydrochloric acid):

$\lambda_{max}$. 221 m$\mu$, $E^{1\%}_{1cm}$. 543

$\lambda_{max}$. 229 m$\mu$, $E^{1\%}_{1cm}$. 564

$\lambda_{max}$. 260 m$\mu$, $E^{1\%}_{1cm}$. 400

Inflexion about 266, 290 and 300 m$\mu$

This product is not described in the literature.

Example IV

PREPARATION OF 3-PYRROLIDYL-$17\beta$-BENZOYLOXY-$\Delta^{1,3,5(10),9(11)}$-ESTRATETRAENE Step A.—0.250 g. of racemic $8\alpha,9\alpha$-epoxy-$3\beta$-methyl-7-oxo-$8\beta$-(3'-oxobutyl)-3,4-[3'$\beta$-benzoyloxy-cyclopentano-(2',1')]-decahydronaphthalene melting at 147° C. were introduced into 20 cc. of pure dioxane. The starting material was obtained according to Example I. The reaction mixture was agitated in an atmosphere of nitrogen for a period of several minutes and 0.800 g. of potassium acetate and 1.15 cc. of distilled water were added. After the reaction mixture was agitated for a period of five minutes at room temperature, 0.40 cc. of a 50% potassium hydroxide solution were introduced and the agitation was continued at room temperature and under an atmosphere of nitrogen for a period of 15 hours. 10 cc. of water and 50 cc. of ether were then added. The aqueous phase was decanted and the ethereal extracts were evaporated under vacuum. A residue of 0.240 g. was obtained which was redissolved in methylene chloride and subjected to chromatography through silicagel. On elution with methylene chloride containing 2% acetone, 0.150 g. of the racemic benzoate of $9\alpha,10\alpha$-epoxy-19-nortestosterone was recovered which after recrystallization from methanol had a melting point of 167° C.

The product occurred in the form of colorless prismatic crystals, very soluble in benzene, soluble in ether, and methanol, and insoluble in water and dilute aqueous acids or alkalies.

This product is not described in the literature.

By application of the above described process to the dextrorotatory enantiomorph of 8α,9α-epoxy 3β-methyl-7-oxo-8β-(3'-oxobutyl)-3,4-[3'β-benzoyloxy - cyclopentano-(2',1')]-decahydronaphthalene, melting at 140° C. and having a specific rotation $[\alpha]_D^{20}=+133°$ (c.=1%, chloroform), the corresponding tetracyclic epoxide was obtained having a melting point of 173° C. and having a specific rotation $[\alpha]_D^{20}=+112°$ (c.=1%, methanol).

This product is not described in the literature.

Step B.—0.100 g. of the racemic benzoate of 9α,10α-epoxy-19-nor-testosterone was dissolved in 1 cc. of anhydrous benzene. 3 cc. of a methanolic solution containing 3.3% of pyrrolidine were added under an atmosphere of nitrogen and the reaction mixture was agitated at room temperature for a period of one hour. The solution had a yellow color after several minutes of agitation. At the end of the reaction the solvent was evacuated under vacuum and the residue triturated with isopropyl ether. After vacuum filtration, the product was washed with isopropyl ether, dried, and 0.080 g. of a product constituting the 17-benzoate of 3-pyrrolidyl-9α,17β-dihydroxy-$\Delta^{1,3,5(10)}$-estratriene, melting at 200° C. was recovered. The compound, which was present in the form of white platelets, was soluble in benzene, chloroform, and a 1:1 mixture of benzene and methanol, slightly soluble in ether, and insoluble in water and dilute aqueous alkalies.

*Analysis.*—$C_{29}H_{35}O_3N$; molecular weight=445.6. Calculated: C, 78.17%; H, 7.92; N, 3.15%. Found: C, 78.6%; H, 7.8%; N, 3.3%.

Ultra-violet spectrum in methylene chloride-ether mixture:

$\lambda_{max}$. 259 mμ, $E_{1\,cm.}^{1\%}=570$ $\lambda_{max}$. 307 mμ, $E_{1\,cm.}^{1\%}=64.8$ This product is not described in the literature.

Step C.—0.070 g. of the 17-benzoate of 3-pyrrolidyl-9α,17β-dihydroxy-$\Delta^{1,3,5(10)}$-estratriene, melting at 200° C., were introduced into 5 cc. of benzene. 0.5 cc. of acetic acid were added and the reaction mixture was heated to reflux. After heating for a period of two hours, the reaction mixture was cooled, a solution of sodium bicarbonate added, and the reaction mixture extracted with chloroform. The extracts were combined and after vacuum evaporation of the extracts to dryness a residue was obtained comprising 3-pyrrolidyl - 17β - benzoyloxy-$\Delta^{1,3,5(10),9(11)}$-estratetraene which was recrystallized in methanol, melting point 240° C.

This product is identical to that described in Example II.

Various modifications of the process and/or products of the present invention may be made without departing from the spirit or scope thereof, and it is to be understood that the invention be limited only as defined in the appended claims.

We claim:

1. A compound having the formula:

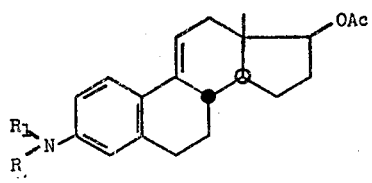

wherein Ac is the acyl radical of an organic carboxylic acid having 1 to 18 carbon atoms and R and $R_1$ are selected from the group consisting of hydrogen, lower alkyl, and lower hydroxyalkyl and when taken together form a heterocyclic ring selected from the group consisting of pyrrolidyl, piperidyl and morpholino.

2. 3 - pyrrolidyl - 17β - benzoyloxy - $\Delta^{1,3,5(10),9(11)}$-estratetraene.

3. 3 - (β - hydroxyethyl) - amino - 17β - benzoyloxy-$\Delta^{1,3,5(10),9(11)}$-estratetraene.

4. A compound having the formula:

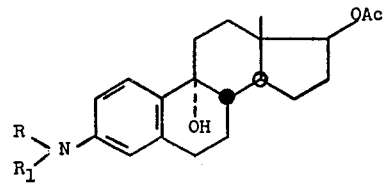

wherein Ac is the acyl radical of an organic carboxylic acid having 1 to 18 carbon atoms and R and $R_1$ are selected from the group consisting of hydrogen, lower alkyl, and lower hydroxyalkyl and when taken together form a heterocyclic ring selected from the group consisting of pyrrolidyl, piperidyl and morpholino.

5. 3-pyrrolidyl-9α-hydroxy - 17β - benzoyloxy-$\Delta^{1,3,5(10)}$-estratriene.

6. A compound having the formula:

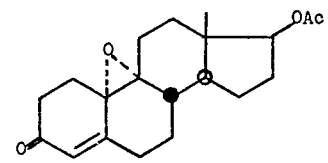

wherein Ac is the acyl radical of an organic carboxylic acid having 1 to 18 carbon atoms.

7. The benzoate ester of 9α,10α-epoxy-19-nor-testosterone.

8. 8α,9α-epoxy-3β-methyl-7-oxo-8β-(3'-oxobutyl) - 3,4-[3'β-acyloxy-cyclopentano-(2',1')]-decahydronaphthalene compounds of the structural formula:

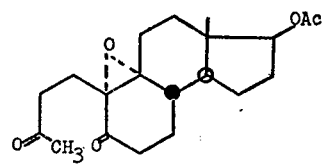

wherein Ac is the acyl radical of an organic carboxylic acid having 1 to 18 carbon atoms.

9. 8α,9α-epoxy-3β-methyl-7-oxo-8β-(3'-oxobutyl) - 3,4-[3'β-benzoyloxy-cyclopentano - (2',1')] - decahydronaphthalene.

10. A process for the preparation of compounds having the formula:

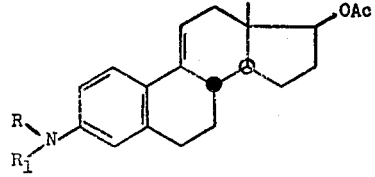

wherein Ac is the acyl radical of an organic carboxylic acid having 1 to 18 carbon atoms and R and $R_1$ are selected from the group consisting of hydrogen, lower alkyl, and lower hydroxyalkyl and when taken together form a heterocyclic ring selected from the group consisting of pyrrolidyl, piperidyl and morpholino, which comprises reacting a compound having the formula:

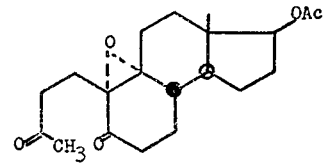

wherein Ac has the above definition with the acid salt of an amine having the formula:

wherein R and R₁ have the above definitions and recovering the desired product.

11. The process of claim 10, wherein 8α,9α-epoxy-3β-methyl-7-oxo-8β-(3′-oxobutyl)3,4-[3′β-benzoyloxy-cyclopentano-(2′,1′)]-decahydronaphthalene is reacted with the acid salt of the said amine.

12. The process of claim 10, wherein the acid salt of the amine is the acetate salt of pyrrolidine.

13. The process of claim 10, wherein the acid salt of the amine is the acetate salt of ethanolamine.

14. The process of claim 10, wherein the reaction is conducted in a non-polar solvent at its reflux temperature.

15. A process for the preparation of a compound having the formula:

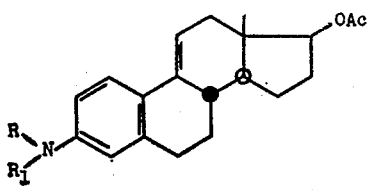

wherein Ac is the acyl radical of an organic carboxylic acid having 1 to 18 carbon atoms and R and R₁ are selected from the group consisting of hydrogen, lower alkyl, and lower hydroxyalkyl and when taken together form a heterocyclic ring selected from the group consisting of pyrrolidyl, piperidyl and morpholino which comprises cyclizing a compound having the formula:

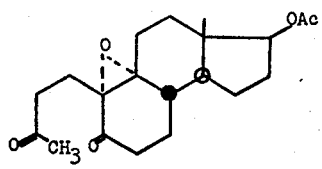

wherein Ac has the above definition to form the corresponding ester of 9α,10α-epoxy-19-nor-testosterone with an alkali metal acetate in the presence of a hydroxide of the same alkali metal, reacting the latter with an amine having the formula:

wherein R and R₁ have the above definitions to form a compound having the formula:

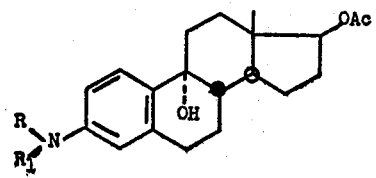

wherein R, R₁ and Ac have the above definitions, dehydrating the latter with acetic acid at reflux temperatures to form the desired compound and recovering said compound.

16. The process of claim 15, wherein the cyclization is effected with potassium acetate in the presence of potassium hydroxide.

17. The process of claim 15, wherein the cyclization is effected in solution in dioxane.

18. The process of claim 15, wherein 8α,9α-epoxy-3β-methyl-7-oxo-8β-(3′-oxobutyl)-3,4-[3′β-benzoyloxy-cyclopentano-(2′,1′)]-decahydronaphthalene is the compound cyclized.

19. The process of claim 15, wherein the amine is pyrrolidine.

20. The process of claim 15, wherein the reaction with the amine is effected in a mixture of methanol and benzene.

21. A process for the production of 3-pyrrolidyl-17β-benzoyloxy-$\Delta^{1,3,5(10),9(11)}$-estratetraene which comprises the steps of reacting $\Delta^{8(9)}$-3β-methyl-7-oxo-8-(3′-oxobutyl)-3,4-[3′β-benzoyloxy-cyclopentano-(2′,1′)]-octahydronaphthalene in an inert organic solvent with perphthalic acid, cyclizing the 8α,9α-epoxy-3β-methyl-7-oxo-8β-(3′-oxobutyl)3,4-[3′β - benzoyloxy-cyclopentano - (2′,1′)]-decahydronaphthalene with potassium acetate in the presence of potassium hydroxide in dioxane to form the benzoate ester of 9α,10α-epoxy-19-nor-testosterone, reacting the latter with pyrrolidine in a solvent mixture of benzene and methanol to form 3-pyrrolidyl-9α-hydroxy-17β-benzoyloxy-$\Delta^{1,3,5(10)}$-estratriene, dehydrating the latter with acetic acid to form 3-pyrrolidyl-17β-benzoyloxy-$\Delta^{1,3,5(10),9(11)}$-estratetraene and recovering said product.

22. A process for the production of 3-pyrrolidyl-17β-benzoyloxy-$\Delta^{1,3,5(10),9(11)}$-estratetraene which comprises the steps of reacting $\Delta^{8(9)}$-3β-methyl-7-oxo-8-(3′-oxobutyl)-3α,4β-[3′β-benzoyloxy-cyclopentano-(2′,1′)]-octahydronaphthalene in an inert organic solvent with perphthalic acid, reacting the 8α,9α-epoxy-3β-methyl-7-oxo-8β-(3′-oxobutyl(-3,4-[3′β-benzoyloxy - cyclopentano - (2′, 1′)]-decahydronaphthalene with pyrrolidine in the presence of a lower alkanoic acid and an inert organic solvent at reflux temperature and recovering said estratetraene.

23. The process of producing 8α,9α-epoxy-3β-methyl-7-oxo-8β-(3′-oxobutyl)-3,4-[3′β-benzoyloxy - cyclopentano-(2′,1′)]-decahydronaphthalene, which comprises the steps of reacting $\Delta^{8(9)}$-3β-methyl-7-oxo-8-(3′-oxobutyl)-3,4-[3′β-benzoyloxy-cyclopentano-(2′,1′)]-octahydronaphthalene in an inert organic solvent with perphthalic acid, and recovering said 8,9-epoxy naphthalene.

References Cited in the file of this patent
UNITED STATES PATENTS

| | | |
|---|---|---|
| 2,673,847 | Spero et al. | Mar. 30, 1954 |
| 2,793,233 | Stork | May 21, 1957 |
| 2,838,492 | Pederson et al. | June 10, 1958 |